United States Patent
Singh

(10) Patent No.: US 11,689,983 B2
(45) Date of Patent: Jun. 27, 2023

(54) REUSE AND MANAGEMENT OF WIRELESS CHANNELS

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 287 days.

(21) Appl. No.: 17/016,578

(22) Filed: Sep. 10, 2020

(65) Prior Publication Data
US 2022/0078689 A1 Mar. 10, 2022

(51) Int. Cl.
*H04W 16/14* (2009.01)
*H04W 36/30* (2009.01)
*H04W 40/34* (2009.01)
*H04W 76/15* (2018.01)
*H04L 43/10* (2022.01)
*H04W 48/20* (2009.01)
*H04W 48/16* (2009.01)

(52) U.S. Cl.
CPC ........... *H04W 36/305* (2018.08); *H04L 43/10* (2013.01); *H04W 16/14* (2013.01); *H04W 40/34* (2013.01); *H04W 48/16* (2013.01); *H04W 48/20* (2013.01); *H04W 76/15* (2018.02)

(58) Field of Classification Search
CPC ....... H04W 41/08; H04W 48/16; H04W 4/50; H04L 43/10
See application file for complete search history.

(56) References Cited

U.S. PATENT DOCUMENTS

| | | | |
|---|---|---|---|
| 2006/0003773 A1* | 1/2006 | Miyata | H04W 24/00 455/452.2 |
| 2007/0025306 A1* | 2/2007 | Cox | H04L 41/0806 370/338 |
| 2008/0171569 A1* | 7/2008 | Pralle | H04B 1/74 455/525 |
| 2016/0164716 A1* | 6/2016 | Dusi | H04L 41/12 370/221 |
| 2017/0188241 A1* | 6/2017 | Mueck | H04W 72/0453 |
| 2017/0208512 A1* | 7/2017 | Aydin | G05D 1/0202 |

(Continued)

OTHER PUBLICATIONS

K. B. S. Manosha et al., "A channel allocation algorithm for Citizens Broadband Radio Service/Spectrum Access System," 2017 European Conference on Networks and Communications (EuCNC), Oulu, Finland, 2017, pp. 1-6, doi: 10.1109/EuCNC.2017.7980711. (Year: 2017).*

*Primary Examiner* — Gary Mui
(74) *Attorney, Agent, or Firm* — Armis IP Law, LLC

(57) ABSTRACT

A network environment includes a communication management resource, a first wireless station, and a second wireless station. The communication management resource initially allocates a first wireless channel to the first wireless station; the first wireless channel is selected from multiple available wireless channels. The communication management resource detects that a second wireless station is a substitute to the first wireless station. For example, the second wireless station is substituted as a replacement to the first wireless station. In response to the detecting that the second wireless station is a substitute to the first wireless station, the communication management resource allocates the first wireless channel to the second wireless station.

31 Claims, 10 Drawing Sheets

(56) References Cited

U.S. PATENT DOCUMENTS

| | | | |
|---|---|---|---|
| 2019/0364565 A1* | 11/2019 | Hmimy | H04W 72/0453 |
| 2020/0059794 A1* | 2/2020 | Singh | H04W 72/04 |
| 2020/0059802 A1* | 2/2020 | Singh | H04W 24/04 |
| 2020/0162328 A1* | 5/2020 | Valenza | H04L 41/0806 |
| 2020/0213862 A1* | 7/2020 | Sevindik | H04W 16/14 |
| 2021/0266949 A1* | 8/2021 | Sharma | H04W 16/14 |
| 2021/0282021 A1* | 9/2021 | Bandyopadhyay | H04W 16/14 |

* cited by examiner

REUSE AND MANAGEMENT OF WIRELESS CHANNELS

BACKGROUND

Conventional wireless networks typically include one or more wireless base stations to provide mobile communication devices access to a remote network such as the Internet. One type of base station is a so-called CBSD (Citizens Broadband Radio Service Device). Such a device uses a wireless channel allocated from CBRS (Citizens Broadband Radio Service) spectrum to support communications with one or more mobile communication devices. The CBRS spectrum is primarily split into two tiers: GAA (General Authorized Access) and PAL (Priority Access License). PAL portion of the spectrum is licenses and owner of the spectrum has guaranteed access all the time, whereas GAA is unlicensed portion and is assigned on first come first serve basis, and the grant is maintained for one week in case of communication failure with SAS (Spectrum Access System).

Typically, one or more wireless channels is allocated to a base station by a SAS (Spectrum Access System) to support communications with one or more mobile communication devices or customer premises equipment. For example, a base station can be configured to communicate with the SAS to receive notification of the wireless channel allocated for use.

Subsequent to wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on request from CBSD; the spectrum allocation/grant to the CBSD can be in a chunks of 10 MHz or 20 MHz and up to 100 MHz assuming LTE operation.

If a CBSD goes out of service (burn out, loses connectivity, failure, etc.) with relinquishing spectrum grant, the SAS will continue the grant assigned for a duration such as a week. In other words, although a respective wireless station may fail, the allocated wireless channel is still assigned to the wireless station (such as CBSD) for a duration such as a week.

BRIEF DESCRIPTION OF EMBODIMENTS

There are deficiencies associated with conventional techniques of allocating GAA wireless channels for use by a CBSD. After a one week period, the spectrum previously allocated to the failing CBSD is released into the GAA pool for allocation to a different CBSD that could be from a different service provider. This disclosure includes the observation that it is desirable for an operator to replace the failing CBSD with a new CBSD and transfer the spectrum grant of the old CBSD over to the new CBSD prior to expiration of the original allocation.

For example, as per current conventional specifications and SAS design as previously discussed, in case of a CBSD failure, a replacement CBSD will not be allocated the same spectrum as the CBSD devices that it replaces until the old channel grant expires. As previously discussed, the old allocation may not expire for a duration such as a week or other suitable amount of time.

Thus, after replacement of a wireless station, a previously allocated wireless spectrum (such as one or more channels) is not immediately available and may not become available to the newly installed wireless station for a week. This inability of the replacement wireless station to operate on the same previously allocated spectrum causes operational issues, especially when the network is design to operate on the same frequency (re-use factor of 1). For example, this will cause operational issues since one to one hardware replacement is not possible as the new CBSD will get a different frequency grant unless this is done after the expiration of the original grant (such as a one week period), after which the original allocated wireless channel is free. Such operation is undesirable because wireless service may not be restored to communication devices that rely on the failing CBSD until the duration of time expires.

Embodiments herein provide novel ways of managing reuse of wireless channels in a wireless network environment.

More specifically, a wireless network environment includes a communication management resource, a first wireless station, and a second wireless station. The second wireless station is a (physical) substitute to the first wireless station for any suitable such as because the first wireless station experiences a failure condition. The communication management resource initially allocates a first wireless channel to the first wireless station. The first wireless channel is selected from multiple available wireless channels. The communication management resource detects that the second wireless station is a substitute to the first wireless station. In response to the detecting that the second wireless station is a substitute to the first wireless station, the communication management resource allocates the first wireless channel to the second wireless station. In one embodiment, allocation of the first wireless channel to the second wireless station includes communicating an identity of the first wireless channel previously used by the first wireless station to the second wireless station.

Thus, in one embodiment, the first wireless channel allocated to the first wireless station is reallocated for use by the second wireless station because the second wireless station takes the place of the first wireless station, which was originally assigned/allocated the first wireless channel.

In accordance with further example embodiments, allocation of the first wireless channel by the communication management resource includes receiving location information indicating a location of the first wireless station prior to substitution.

Detection that the second wireless station is a substitute to the first wireless station can occur in any number of different ways. In one embodiment, detecting that the second wireless station is a substitute to the first wireless station includes detecting that the second wireless station resides at the location as specified by the location information. In accordance with another example embodiment, detecting that the second wireless station is a substitute to the first wireless station includes detecting (physical) replacement of the first wireless station with the second wireless station.

Still further example embodiments include, via the communication management resource, detecting a failure of the first wireless station communicating a heartbeat communication for continued allocation of the first wireless channel. Failure to receive a heartbeat signal indicates that the first wireless station may be experiencing a failure condition.

Further embodiments herein include, via the communication management resource, detecting that the second wireless station is a substitute to the first wireless station during registration of the second wireless station as a CBSD (Citizen Band Radio Service Device) communication device with the communication management resource (such as a spectrum access system).

Yet further example embodiments herein include, via the communication management resource, receiving a model number assigned to the first wireless station. Detecting that the second wireless station is a substitute with respect to the first wireless station includes receiving, at the communication management resource, notification that the second wireless station is assigned a same model number as the model number assigned to the first wireless station.

Further embodiments herein include, via the communication management resource, receiving a spectrum inquiry from the second wireless station. In response to receiving the spectrum inquiry, communicating a spectrum inquiry response to the second wireless station, the spectrum inquiry response including an identity of the first wireless channel.

In still further example embodiments, the communication management resource receives first installation parameters of the first wireless station during registration of the first wireless station to use the first wireless channel. The communication management resource compares second installation parameters received from the second wireless station to the first installation parameters. The communication management resource then detects that the second wireless station is a substitute to the first wireless station based on results of the comparing.

Further embodiments herein include, via the communication management resource, detecting that the second wireless station is a substitute to the first wireless station based at least in part on detecting that: i) the second installation parameters received from the second wireless station match the first installation parameters, and ii) a unique identifier value of the second wireless station is different than a unique identifier value assigned to the first wireless station.

In one embodiment, the first wireless channel is allocated for a duration of time to the first wireless station. The communication management resource allocates the first wireless channel to the second wireless station prior to expiration of the duration of time.

In still further example embodiments, detecting that the second wireless station is a substitute to the first wireless station includes: during registration of the second wireless station, receiving notification that the second wireless station is operated by a same service provider as the first wireless station.

Embodiments herein facilitate reuse of wireless channels in a network environment during conditions in which a first communication device is replaced with a second communication device. These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate management of communications in a network environment. The instructions, when executed by computer processor hardware, cause the computer processor hardware (such as one or more co-located or disparately located processor devices) to: allocate a first wireless channel to a first wireless station, the first wireless channel selected from multiple available wireless channels; detect that a second wireless station is a substitute to the first wireless station; and in response to the detecting that a second wireless station is a substitute to the first wireless station, allocate the first wireless channel to the second wireless station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless connectivity. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
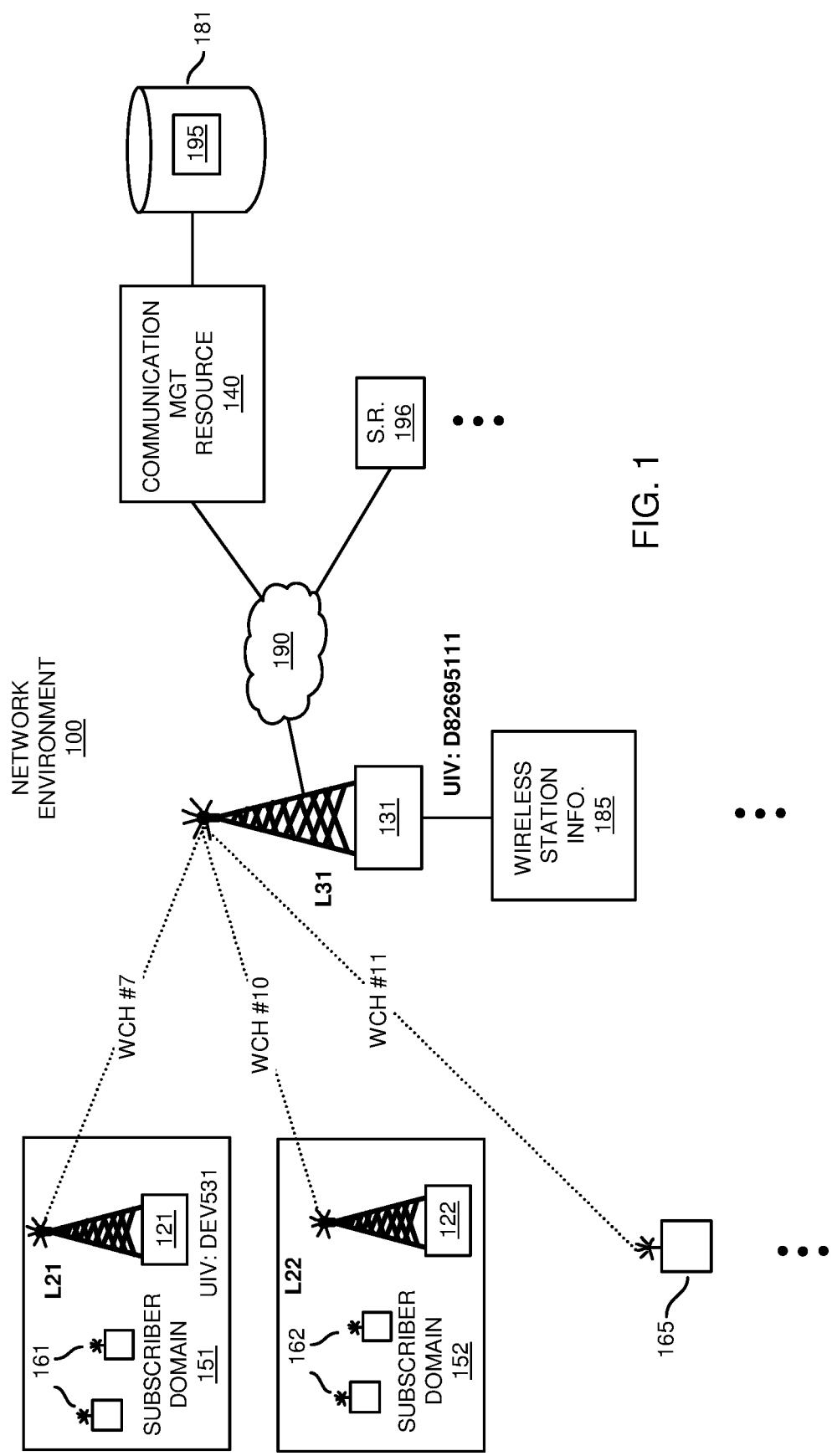
FIG. 1 is an example diagram illustrating a wireless network environment and allocation of one or more wireless channels according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A wireless network environment includes a communication management resource and multiple wireless stations such as a first wireless station, second wireless station, etc. In one embodiment, the first wireless station is physically substituted (replaced) with a second wireless station. The second wireless station is thus a physical substitute to the first wireless station, which may occur for any suitable reason such as because the first wireless station experiences a failure condition.

Prior to the physical substitution, the communication management resource initially allocates one or more wireless channels such as a first wireless channel to the first wireless station. The first wireless channel is selected from multiple available wireless channels. The communication management resource detects that the second wireless station is a substitute to the first wireless station. In response to the detecting that the second wireless station is a substitute to the first wireless station, the communication management resource allocates the first wireless channel again to the second wireless station because the first wireless station is no longer present in the network environment.

In one embodiment, allocation of the first wireless channel to the second wireless station includes communicating an identity of the first wireless channel previously allocated and used by the first wireless station to the second wireless station. Thus, the second wireless base station is allocated the same wireless channel as the first wireless base station.

Now, more specifically, FIG. 1 is an example diagram illustrating a wireless network environment and allocation of wireless channels according to embodiments herein.

In this example embodiment, network environment 100 includes communication management resource 140 (allocation management resource such as a spectrum access system and/or domain proxy), network 190 (such as a packet-switched network, Internet, and/or other suitable media to convey data), wireless base station 131, and multiple subscriber domains 151, 152, etc.

Each of the subscriber domains includes a respective instance of additional communication devices such as including customer premises equipment. For example, customer premises equipment 121 resides in subscriber domain 151; customer premises equipment 122 resides in subscriber domain 152; etc. In one embodiment, the customer premises equipment 121 provides wireless connectivity to communication devices 161; customer premises equipment 122 provides wireless connectivity to communication devices 162; etc.

The wireless base station 131 is allocated one or more wireless channels to communicate with respective communication devices such as customer premises equipment 121 at location L21, customer premises equipment 122 at location L22, etc. Via communications through a combination of respective customer premises equipment and wireless base station 131, the communication devices 161, 162, etc., are able to access remote network 190 and corresponding server resources.

Note that each of the resources as described herein can be implemented as hardware, software, or a combination of hardware and software. For example, the communication management resource 140 can be implemented as communication management hardware, communication management software, or a combination of communication management hardware and software; the wireless base station 131 can be implemented as wireless base station hardware, wireless base station software, or a combination of wireless base station hardware and software; the customer premises equipment 121 can be implemented as customer premises equipment hardware, customer premises equipment software, or a combination of customer premises equipment hardware and software; and so on.

As further shown in this example embodiment, the wireless base station 131 is assigned unique identifier value D82695111 (such as a so-called CBSD identifier value) and resides at location L31. As further shown and discussed in FIG. 2, wireless base station 131 is assigned wireless station information 185 indicating attributes associated with the wireless base station 131.

Figure 2:
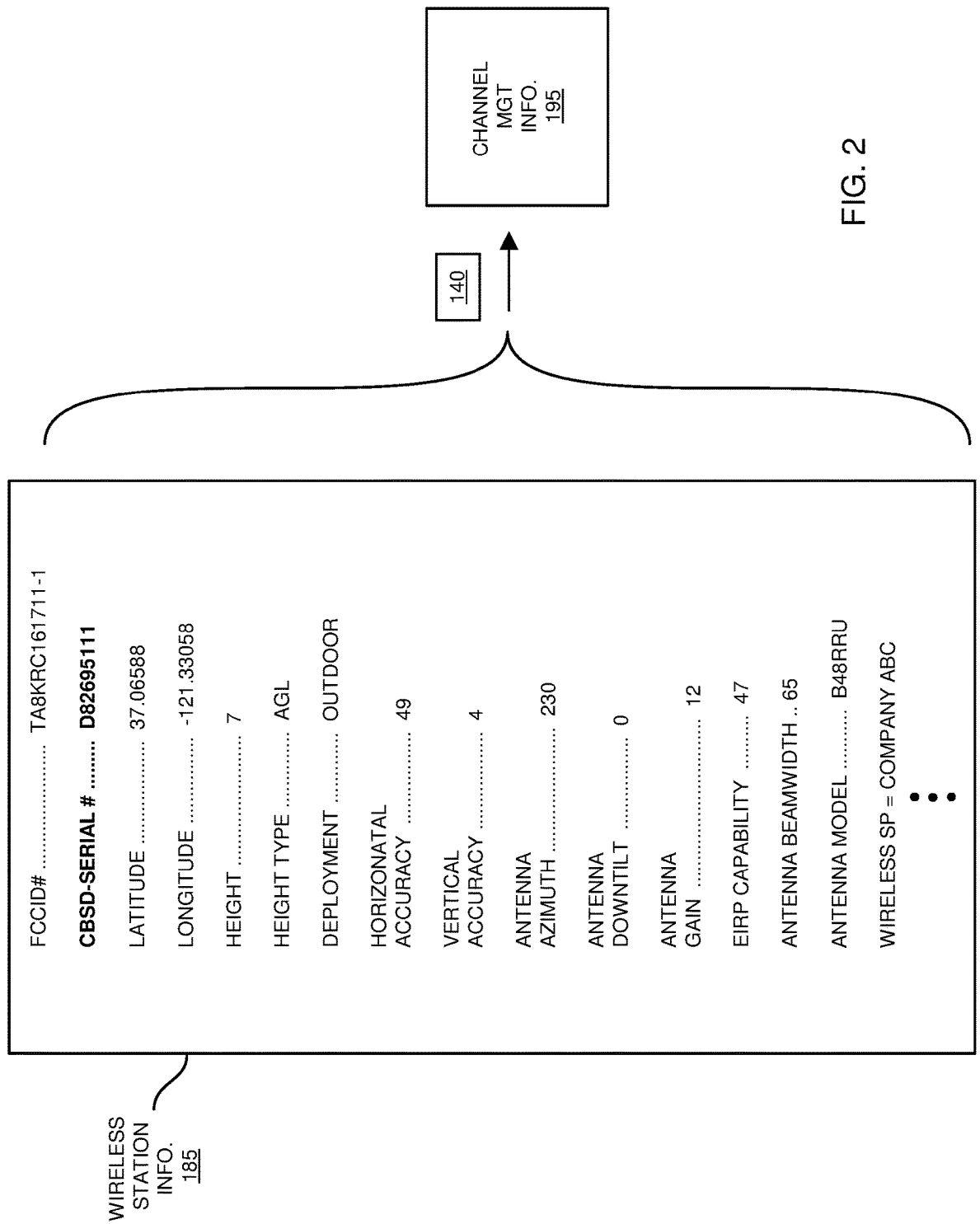
FIG. 2 is an example diagram illustrating wireless base station information associated with a first wireless base station according to embodiments herein.

FIG. 2 is an example diagram illustrating wireless base station information associated with a respective wireless base station according to embodiments herein.

In this example embodiment, the wireless station information 185 indicates attributes associated with the wireless base station 131.

For example, the wireless station information 185 indicates that the wireless base station 131 is assigned FCCID #=TA8KRC161711-1. In one embodiment, the FCCID # is a model number of an FCC (Federal Communication Commission) approved type of wireless communication device.

The wireless station information 185 further indicates that the wireless base station 131 is assigned a unique identifier value of D82695111 (such as CBSD-identifier value).

The wireless station information 185 indicates that the wireless base station 131 is located at latitude of 37.065880 and longitude of −121.33058 (such as describing location L31).

The wireless station information 185 indicates that the wireless base station 131 is positioned at a height of 7 feet, such as on an aerial wire, post, telephone pole, etc., and is a height type of AGL.

The wireless station information 185 indicates that the wireless base station 131 is deployed outdoors (e.g., not in a building).

The wireless station information 185 indicates that the wireless base station 131 has a horizontal accuracy of 49 and a vertical accuracy of 4.

The wireless station information 185 indicates that the wireless base station 131 has an antenna azimuth of 230, antenna down tilt of 0, and an antenna gain of 12.

The wireless station information 185 indicates that the wireless base station 131 has a wireless transmit power capability of 47 dBm.

The wireless station information 185 indicates that the wireless base station 131 has a beamwidth of 65 degrees.

The wireless station information 185 indicates that the wireless base station 131 implements an antenna model of B48RRU.

The wireless station information 485 indicates that the wireless base station 431 is deployed via wireless service provider company ABC (such as one of multiple wireless service providers).

In one embodiment, as further discussed below, the wireless base station 131 communicates the wireless station information 185 to the communication management resource 140 during registration. The communication management resource 185 stores an instance of the wireless station information 185 in the allocation management information 195.

Figure 3:
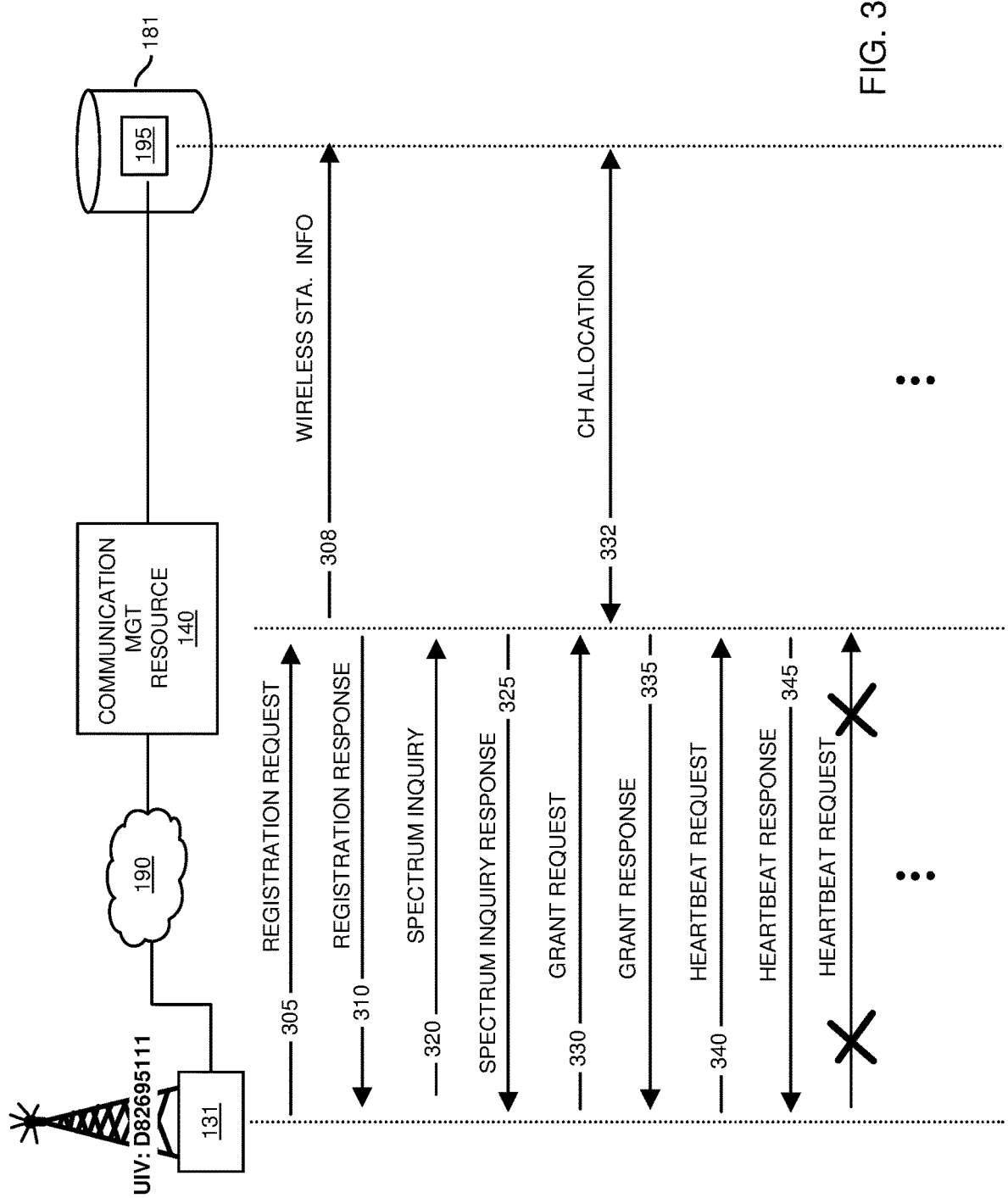
FIG. 3 is an example diagram illustrating conveyance of communications amongst multiple communication devices and wireless channel allocation management to the first wireless base station according to embodiments herein.

FIG. 3 is an example diagram illustrating conveyance of communications amongst multiple communication devices and wireless channel allocation management according to embodiments herein.

As shown in FIG. 3, the wireless base station 131 registers with the communication management resource 140 for allocation of one or more wireless channels supporting corresponding communications.

Via communications 305, the wireless base station 131 communicates a registration request to the communication management resource 140. In one embodiment, the communications 305 include the wireless station information 185 associated with the wireless base station 131.

Via communications 308, the communication management resource 140 stores the received wireless station information 185 in the repository 181 as part of allocation management information 195.

Via communications 310, the communication management resource 140 communicates a registration response to the wireless base station 131. In one embodiment, the communications 310 confirm registration of the wireless base station 131 with the communication management resource 140 (such as spectrum access system).

Via communications 320 from the wireless base station 131, the communication management resource 140 receives a spectrum inquiry. In response to receiving the spectrum inquiry, the communication management resource 140 communicates a spectrum inquiry response (such as in communications 325) to the wireless base station 131. In one embodiment, the communications 325 indicate an identity of one or more available wireless channels.

Via communications 330 from the wireless base station 131, the communication management resource 140 receives a grant request for allocation of one or more wireless channels to communicate in the network environment 100.

In response to receiving the wireless channel grant request, the communication management resource 140 records allocation of one or more wireless channels to the wireless base station 131 via communications 332.

Additionally, in response to receiving the grant request in communications 330, the communication management resource 140 transmits communications 335 to the wireless base station 131. In one embodiment, the communications 335 include notification of one or more allocated wireless channels to the wireless base station 131 by the communication management resource 140. As previously discussed, in one embodiment, the communication management resource 140 allocates wireless channels #7, #10, #11 to the wireless base station 131. The wireless base station 131 then uses the allocated one or more wireless channels to provide communication devices wireless access to a remote network 190 in a manner as previously discussed.

In accordance with further example embodiments, the wireless base station 131 periodically sends heartbeat requests for each of their approved wireless channel grants in order to receive authorization to transmit over such wireless channels.

For example, via communications 340, the wireless base station 131 communicates a respective heartbeat request to the communication management resource 140. In response to the communication management resource 140 receiving the heartbeat request and determining that the allocation of one or more corresponding channels (such as wireless channels #7, #10, and #11 is still effective, the communication management resource 140 communicates a heartbeat response message to the wireless base station 131 via communications 345. The communications 345 enable the wireless base station 131 continued use of the allocated wireless channels.

In one embodiment, as previously discussed, the wireless base station 131 may experience a respective failure even though it has been assigned/allocated multiple wireless channels #7, #10, and #11 for a duration of time. In such an instance, the communication management resource 140 no longer receives heartbeat request messages from the wireless base station 131. In one embodiment, the communication management resource 140 stores information that the wireless base station 131 is potentially a failed CBSD that might be replaced with a proper functioning CBSD because the communication management resource 140 no longer receives timely heartbeat request messages from the wireless base station 131.

Figure 4:
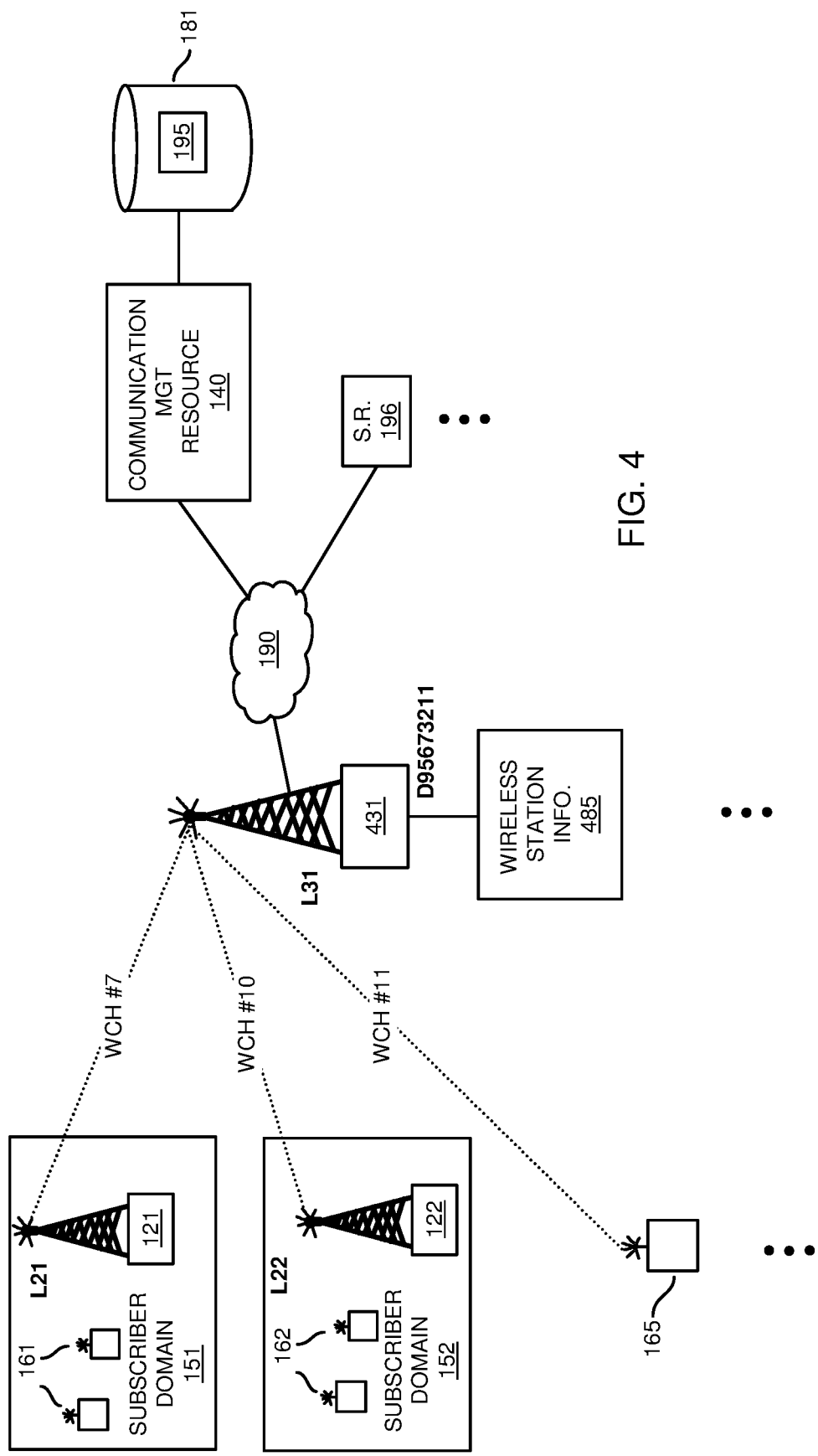
FIG. 4 is an example diagram illustrating replacement of the first wireless base station with a substitute (second) wireless base station according to embodiments herein.

FIG. 4 is an example diagram illustrating replacement of an original wireless base station with a substitute wireless base station according to embodiments herein.

In this example embodiment, the wireless base station 131 in FIG. 1 is replaced with the wireless base station 431 as shown in FIG. 4. As previously discussed, the wireless base station 131 may be replaced in response to failure of the wireless base station 131.

In one nonlimiting example embodiment, a respective service provider (such as wireless service provider company ABC) learns of the failure of the wireless base station 131 via communications with the wireless base station 131. For example, the service provider (such as operating server resource 196) may attempt communications with the wireless base station 131 through network 190 and not receive any response from the wireless base station 131, customers provided wireless services associated with the wireless base station 131 may provide input indicating failed wireless service associated with the wireless base station 131, the service provider ABC may receive a status report from the wireless base station 131 indicating its failed state, and so on.

Further in this example embodiment, note that substitute wireless base station 431 is assigned wireless station information 485. Details of wireless station information 485 assigned to the wireless base station 431 are shown in FIG. 5 below.

As further discussed below in FIG. 6, the new wireless base station 431 registers with the communication management resource 140 to use one or more wireless channels in the network environment 100. Wireless base station 431 may or may not be aware that it is a substitute for the wireless base station 131.

Figure 5:
FIG. 5 is an example diagram illustrating wireless base station information associated with a respective substitute wireless base station according to embodiments herein.

FIG. 5 is an example diagram illustrating wireless base station information associated with a respective substitute wireless base station according to embodiments herein.

In this example embodiment, the wireless station information 485 indicates attributes (such as installation parameters, assignment information, operational information, wireless service provider information, etc.) associated with the wireless base station 431.

For example, the wireless station information 485 indicates that the wireless base station 431 is assigned FCCID #=TA8KRC161711-1. In one embodiment, the FCCID # is a model number of an FCC approved type of wireless communication device.

The wireless station information 485 indicates that the wireless base station 131 is assigned a unique identifier value of D95673211 (such as CBSD-identifier value).

The wireless station information 485 indicates that the wireless base station 431 is located at L31 such as the latitude of 37.065880 and a longitude of negative 121.33058.

The wireless station information 485 indicates that the wireless base station 431 is positioned at a height of 7 feet, such as on an aerial wire, post, telephone pole, etc., and is a height type of AGL.

The wireless station information 485 indicates that the wireless base station 431 is deployed outdoors.

The wireless station information 485 indicates that the wireless base station 431 has a horizontal accuracy of 49 and the vertical accuracy of 4.

The wireless station information 485 indicates that the wireless base station 431 has an antenna azimuth of 230, antenna down tilt of 0, and an antenna gain of 12.

The wireless station information 485 indicates that the wireless base station 431 has a wireless transmit power capability level of 47 DBm or other suitable value.

The wireless station information 485 indicates that the wireless base station 431 has a beamwidth of 65 degrees.

The wireless station information 485 indicates that the wireless base station 431 has an antenna model of B48RRU.

The wireless station information 485 indicates that the wireless base station 431 is deployed via wireless service provider company ABC (such as one of multiple wireless service providers).

In one embodiment, as further discussed below, the wireless base station 431 communicates the wireless station information 485 to the communication management resource 140. The communication management resource 485 stores an instance of the wireless station information 485 in the allocation management information 195.

Figure 6:
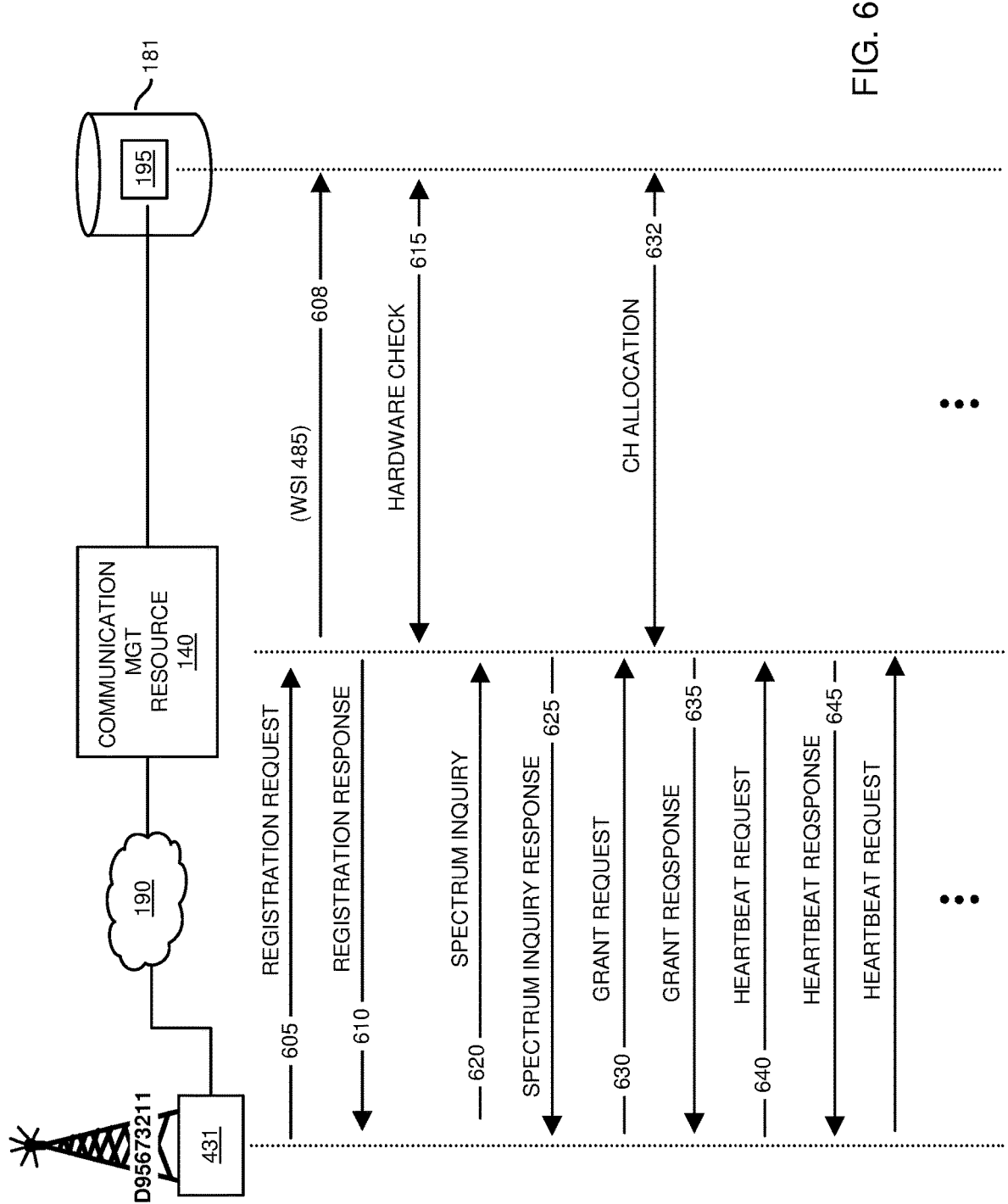
FIG. 6 is an example diagram illustrating conveyance of communications amongst multiple communication devices and wireless channel allocation management according to embodiments herein.

FIG. 6 is an example diagram illustrating conveyance of communications amongst multiple communication devices and wireless channel allocation management according to embodiments herein.

As shown in FIG. 6, the wireless base station 431 registers with the communication management resource 140 for allocation of one or more wireless channels supporting corresponding communications.

More specifically, via communications 605, the wireless base station 431 communicates a registration request to the communication management resource 140. In one embodiment, the communications 605 include the wireless station information 485 associated with the wireless base station 431.

Via communications 608, the communication management resource 140 stores the received wireless station information 485 in the repository 181 as part of allocation management information 195.

Via communications 610, the communication management resource 140 communicates a registration response to the wireless base station 431. In one embodiment, the communications 610 confirm registration of the wireless base station 431 with the communication management resource 140 (such as spectrum access system).

Via communications 615, the communication management resource 140 determines (such as via processing in FIG. 7) if the wireless base station 431 is a substitute to the wireless base station 131. If so, the communication management resource 140 prepares to transfer the one or more wireless channels #7, #10, and #11 of the wireless base station 431. In one embodiment, the transfer includes allocating the wireless channel #7, #10, and #11 to the wireless base station 431 for a remaining duration of time in which the wireless channels #7, #10, and #11 were originally allocated for use by the wireless base station 131.

Via communications 620 from the wireless base station 431, the communication management resource 140 receives a spectrum inquiry. In response to receiving the spectrum inquiry, the communication management resource 140 communicates a spectrum inquiry response (such as in communications 625) to the wireless base station 431. In one embodiment, the communications 625 indicate available one or more wireless channels. In further example embodiments, the available wireless channels as specified by the communications 625 include wireless channels #7, #10, and #11 previously assigned to the failed wireless base station 131.

Via further communications 630 received from the wireless base station 431, the communication management resource 140 receives a request for allocation of one or more wireless channels to communicate in the network environment 100. The request may include a request for wireless channels #7, #10, and #11.

In response to receiving the wireless channel request, the communication management resource 140 initiates a transfer of wireless channels #7, #10, and #11 to wireless base station 431. For example, the communication management resource 140 records allocation of one or more wireless channels #7, #10, and #11 to the wireless base station 431 via communications 632.

Additionally, in response to receiving the grant request in communications 630, the communication management resource 140 transmits communications 635 to the wireless base station 431. In one embodiment, the communications 635 include notification of one or more allocated wireless channels #7, #10, and #11 to the wireless base station 431 by the communication management resource 140. The wireless base station 431 then uses the allocated one or more wireless channels #7, #10, and #11 to provide communication devices (such as customer premises equipment 121, communication devices 161, customer premises equipment 122, communication devices 162, etc.) wireless access to the remote network 190. Thus, wireless base station 431 provides the same connectivity that wireless base station 131 would have provided to the corresponding communication devices such as customer premises equipment 121, customer premises equipment 122, etc.

In accordance with further example embodiments, in a manner as previously discussed, via communications 640, the wireless base station 431 periodically sends heartbeat requests for each of the allocated wireless channel grants (such as wireless channels #7, #10, and #11) in order to receive continued authorization to transmit over such wireless channels. In response to the communication management resource 140 determining that the allocation of one or more corresponding channels #7, #10, and #11 is still effective (for a prior allocation of wireless channels to the wireless base station 131 for a duration of time), the communication management resource 140 communicates a heartbeat response message to the wireless base station 431 via communications 645.

The wireless base station 431 continues to communicate heartbeat request communications to the communication management resource 140 to continue use of wireless channels #7, #10, and #11.

Thus, the communication management resource 140 initially allocates wireless channels #7, #10, and #11 to the first wireless station 131. The wireless channels are selected from multiple available wireless channels (such as GAA channels allocated to general access users). The communication management resource 140 detects that the second wireless station 431 is a substitute to the first wireless station 131. In response to the detecting that the second wireless station 431 is a substitute to the first wireless station 131, and that the wireless base station 431 was or still is allocated wireless channel #7, 10, and #11, the communication management resource 140 allocates and/or notifies the wireless base station 431 that the wireless channels #7, #10, and #11 are allocated for use by the wireless base station 431. In one embodiment, allocation of the wireless channels #7, #10, and #11 to the second wireless station 431 includes communicating an identity of the wireless channels #7, #10, and #11 previously used by the first wireless station 131 to the second wireless station 431.

Figure 7:
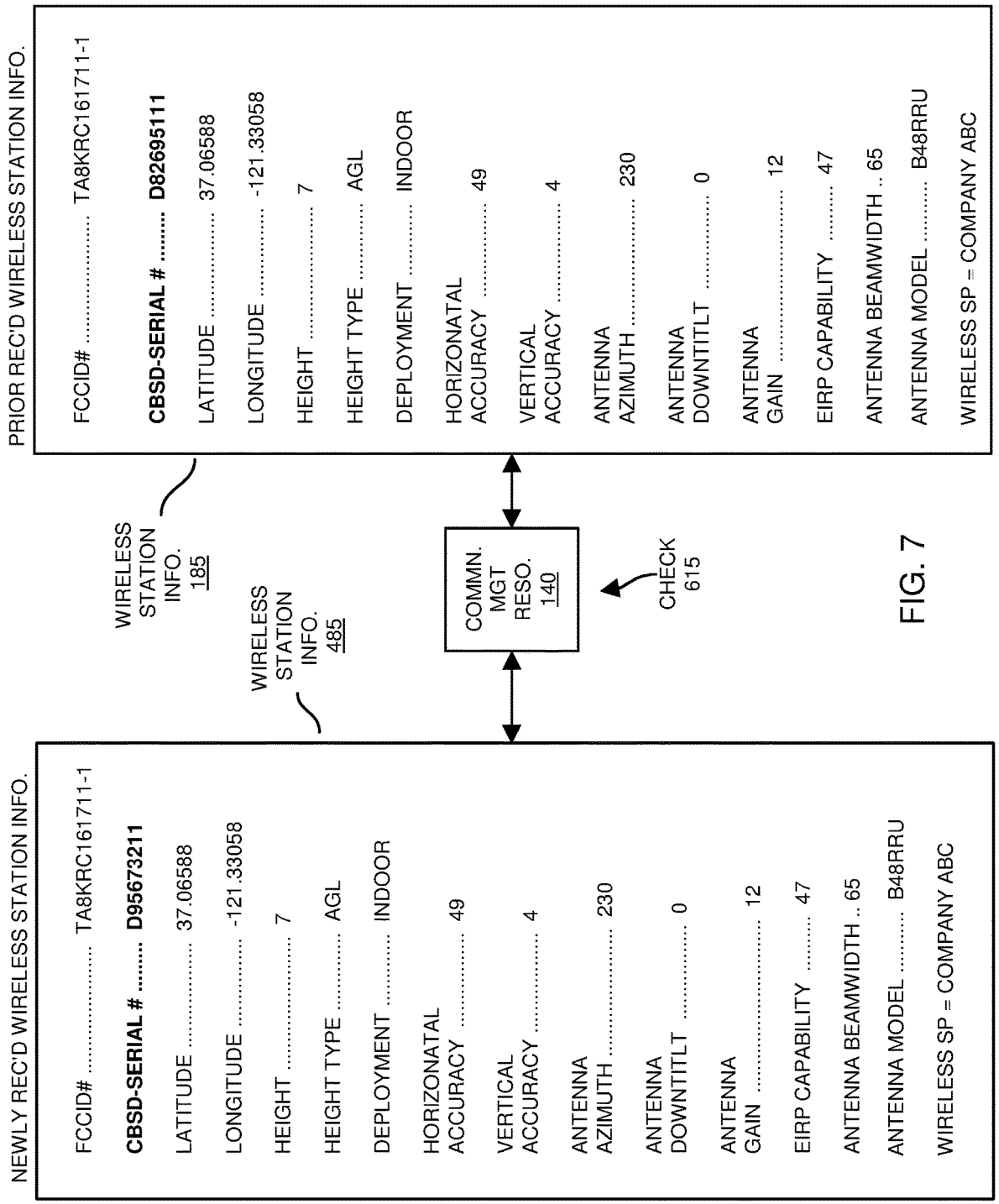
FIG. 7 is an example diagram illustrating comparison of newly received wireless base station information to previously received wireless base station information according to embodiments herein.

FIG. 7 is an example diagram illustrating comparison of newly received wireless base station information to previously received wireless base station information according to embodiments herein.

As previously discussed, the communication management resource 140 stores the original wireless station information 185 associated with the wireless base station 131 in the repository 181 as part of allocation management information 195. In one embodiment, the communication management resource 140 receives the wireless station information 485 during registration of the wireless base station 431 to use one or more wireless channels.

Further, during registration of the wireless base station 431, the communication management resource receives wireless station information 485 associated with or assigned to the wireless base station 431.

In one embodiment, the communication management resource 140 performs a respective hardware and/or software check 615 to determine whether or not the wireless base station 431 is currently allocated any wireless channels. In such an instance, because the wireless base station 431 is a substitute to the wireless base station 131 and newly booted, the new wireless base station 431 is not currently assigned use of any wireless channels yet.

Recall that the wireless base station 131 is still assigned one or more wireless channels as indicated by the allocation management information 195. Additionally, as previously discussed, the communication management resource 140 discontinues receiving heartbeat request messages from the wireless base station 131 during a respective failure condition. In one embodiment, the communication management resource 140 flags or tags any communication device in wireless network environment 100 that were once operational but no are no longer communicating heartbeat request messages to the communication management resource 140. The failure of receiving heartbeat request messages at the communication management resource 140 can occur due to any number of different conditions. For example, there may be a failure in network 190, resulting in the inability of the wireless base station 131 from communicating messages to the communication management resource 140. Alternatively, the wireless base station 131 may have a failure condition in which the wireless base station is no longer functional (such as inability to wireless and communicate in the wireless network environment, inability to originate messages for communication to the communication management resource 140, etc.).

The failure condition of wireless base station 131 can occur for any suitable reason such as due to a lightning strike, electronic circuit board failure, power failure, etc.

Assume in this example embodiment that the wireless base station 131 experienced a catastrophic failure in which the wireless service provider deems that the wireless base station 131 is no longer able to provide a desired functionality of providing communication devices connectivity to the remote network 190. Because the wireless base station 131 is flagged (at the communication management resource 140) as a candidate for possibly being substituted with a new wireless base station as a result of not receiving heartbeat messages, the communication management resource 140 compares the wireless station information 485 received during registration of wireless base station 431 to the wireless station information 185 stored in the repository 181.

In this example embodiment, the only difference between the wireless station information 185 assigned to the wireless base station 131 and the wireless station information 485 assigned to the wireless base station 431 is the serial number information. For example, according to the wireless station information 185, the wireless base station 131 is assigned CBSD-SERIAL #D82695111. The newly registered wireless base station 431 is assigned CBSD-SERIAL #D95673211.

Further in this example embodiment, assume that the wireless base station 431 is a physical substitute for wireless base station 131 such as because the wireless service provider determined an inability of the wireless base station 131 to provide wireless services to corresponding communication devices.

Detection (by the communication management resource 140) that the wireless station 431 is a substitute for the wireless station 131 can occur in any number of different ways.

For example, in one embodiment, the communication management resource 140 detects that the second wireless station 431 is a substitute to the first wireless station 131 based at least in part on detecting that the second wireless station 431 resides at the location L31 (such as latitude 37.06588, longitude equals −121.33058), which is the exact same location L31 (such as latitude 37.06588, longitude equals −121.33058) assigned to the wireless base station 431. In this instance, matching of the location information indicates that the wireless base station 431 is a substitute to the wireless base station 131.

Additionally, or alternatively, as previously discussed, detection of the wireless base station 431 being a substitute to wireless base station 131 includes, via the communication management resource 140 and comparing via check 615, detecting a failure of the first wireless station 131 communicating a heartbeat communication for continued allocation of one or more assigned wireless channels. Failure to receive a heartbeat signal from the wireless base station 131 indicates that the first wireless station 131 may be experiencing a failure condition. In one embodiment, failure of receiving a heartbeat request from the wireless base station 131 and receiving new wireless station information 485 for the new wireless base station 431 at the location L31 (and/or matching of one or more parameters in wireless station information 184 and wireless station information 485 confirms to the communication management resource 140 that the wireless base station 431 is a substitute to the wireless base station 131.

In one embodiment, the communication management resource 140 detects that the second wireless station 431 is a substitute to the first wireless station 131 during or just after registration of the second wireless station as a CBSD (Citizen Band Radio Service Device) communication device with the communication management resource 140 (such as a spectrum access system).

Yet further example embodiments herein include, via the communication management resource 140, receiving a model number (such as FFCID number or other suitable value) assigned to the first wireless station 131. Detection that the second wireless station 431 is a substitute with respect to the first wireless station 131 includes receiving, at the communication management resource 140, notification that the second wireless station 431 is assigned a same model number (such as FCCID #=TA8KRC161711-1) as the model number (such as FCCID #=TA8KRC161711-1) assigned to the first wireless station 131.

In accordance with further example embodiments, the communication management resource 140 determines that the wireless base station 431 is a replacement to the wireless base station 131 in response to detecting that the CBSD-serial # assigned to each of the wireless base stations 131 and 431 is different and that one or more other wireless base station parameters (such as latitude, longitude, height, height type, deployment, horizontal accuracy, vertical accuracy, antenna as is, antenna down tilt, antenna gain, EIRP capability, antenna beam width, antenna model, etc.) assigned to the wireless base station 131 and the wireless base station 431 are the same. The greater the amount of matching parameter values in wireless station information 485 (as-signed to the wireless base station 131) and the wireless station information 185 (assigned to the wireless base station 431), the more likely it is that the newly detected wireless base station 431 is a substitute to the prior wireless base station 131.

Note that the communication management resource 140 may continue to receive heartbeat messages from the wireless base station 131. Receipt of such messages indicates that the wireless base station 131 is still active and most likely functional. In accordance with further example embodiments, if the communication management resource 140 receives the wireless station information 485 during a condition in which there is no failure of receiving heartbeat messages from the wireless base station 131, the communication management resource 140 may assume that the new wireless base station 431 is installed to provide additional wireless services to communication devices in the immediate area because there are no heartbeat message failures of wireless base station 131. In such an instance, the communication management resource 140 may allocate one or more same of different wireless channels to the new wireless base station 431 while the original wireless base station provides continued wireless collectivity via the original allocated wireless channels.

In still further example embodiments, the wireless station information can indicate a respective identity of a service provider providing wireless services in the network environment 100. In one embodiment, the communication management resource 140 detects that the wireless base station 431 is a substitute to the first wireless station 131 during registration of the second wireless station 431 in which the communication management resource 104 receives notification that the second wireless station 431 is operated by a same service provider (such as service provider ABC) as the first wireless station 131.

In accordance with further example embodiments, the communication management resource 140 receives first installation parameters (such as via wireless station information 185) of the first wireless station 131 during registration of the first wireless station 131. Via check 615 as previously discussed, the communication management resource 140 compares installation parameters (such as wireless station information 485) received from the second wireless station 431 to the first installation parameters (such as second wireless station information 185). The communication management resource 140 then detects that the second wireless station 431 is a substitute to the first wireless station 131 based on results of the comparing (such as matching one or more parameters in wireless station information 185 and wireless station information 485).

Further embodiments herein include, via the communication management resource 140, detecting that the second wireless station 431 is a substitute to the first wireless station 131 based at least in part on detecting that: i) the installation parameters in wireless station information 485 received from the second wireless station 431 match the first installation parameters in wireless station information 185, and ii) a unique identifier value (D95673211) of the second wireless station 431 is different than a unique identifier value (D82695111) assigned to the first wireless station 131.

As previously discussed, in one embodiment, the wireless channels #7, #10, and #11 are allocated for a respective duration of time to the first wireless station 131. In one nonlimiting example embodiment, instead of waiting until the expiration of the duration of time, the communication management resource 140 allocates the wireless channels #7, #10, and #11 to the second wireless station 431 prior to expiration of the respective duration of time. In one embodiment, as previously discussed, the communication management resource 140 allocates the wireless channels #7, #10, and #11 for the remainder of the duration of time that the wireless channels were assigned to the wireless base station 131.

Figure 8:
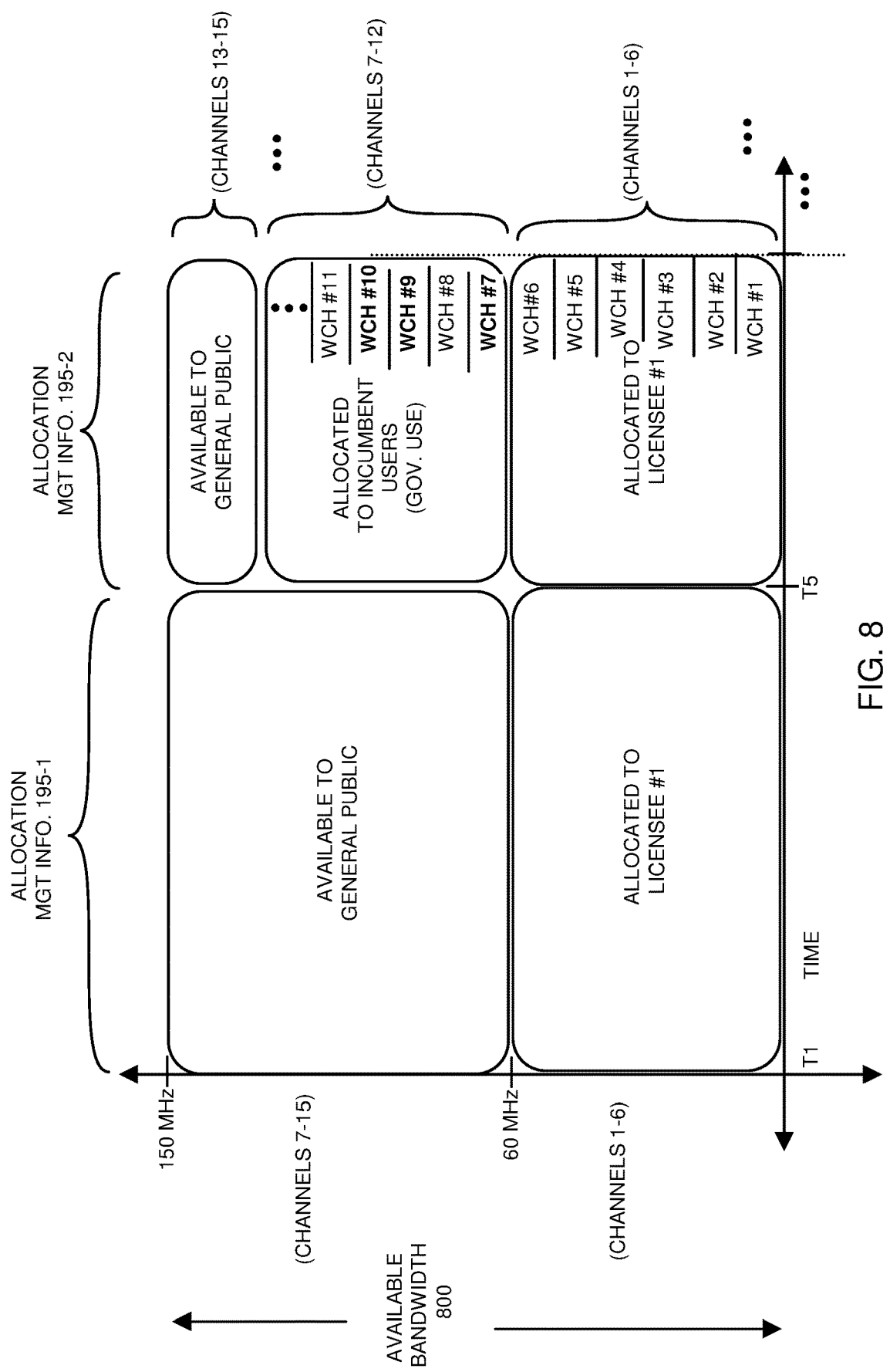
FIG. 8 is an example diagram illustrating dynamic use of wireless spectrum according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, communication management resource 140 (such as spectrum access system, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use as shown in the content access information 195-2 as shown in FIG. 8.

More specifically, in this example, the allocation management information 195-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 195-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 or wireless base station 431 at or around time T5 that the wireless base station 131 and corresponding customer premises equipment 121 are no longer able to use wireless channel #7 because it has been revoked and assigned for use by the incumbent user.

In response to revocation of the allocation of wireless channels 7-12, the communication management resource 140 notifies the wireless base station 131 or wireless base station 431 at or around time T5 that the wireless base station 131 and corresponding customer premises equipment 122 are no longer able to use wireless channel #10 because it has been revoked and assigned for use by the incumbent user. In response to revocation of the allocation of wireless channels 7-12, the communication management resource 140 notifies the wireless base station 131 or wireless base station 431 at or around time T5 that the wireless base station 131 and corresponding communication device 165 are no longer able to use wireless channel #11 because it has been revoked and assigned for use by the incumbent user.

Thus, between time T1 and time T5, the wireless base station 131 or wireless base station 431 uses the wireless channels #7, #10, #11, etc., to provide wireless service to the communication devices such as customer premises equipment 121, customer premises equipment 122, communication device 165, etc., and corresponding connectivity to the remote network 190. At or around time T5, the communication management resource 140 deallocates use of the wireless channels #7, #10, and #11 from the wireless base station 131 or wireless base station 431 in favor of use of those wireless channels #7, #10, and #11 by the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

Figure 9:
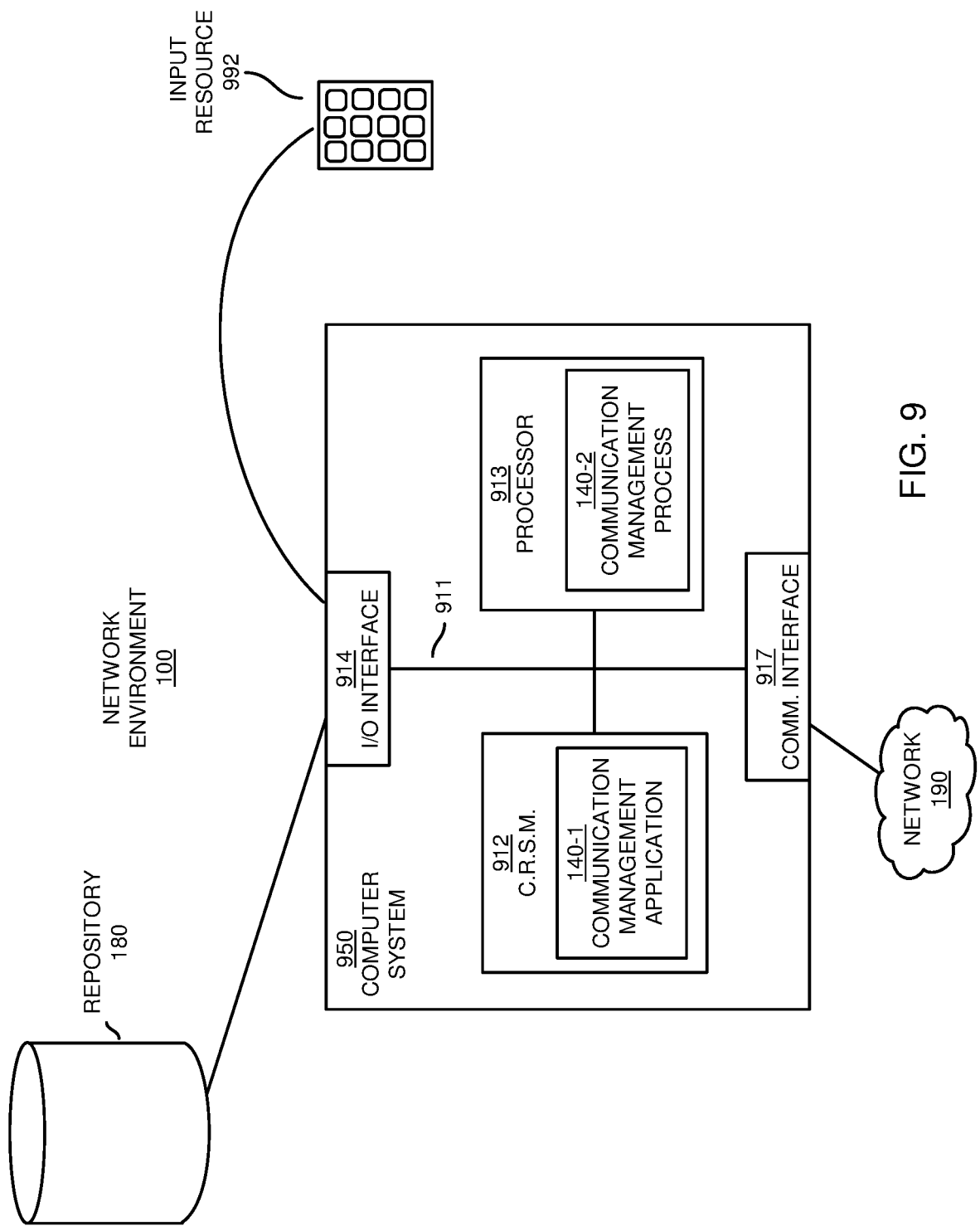
FIG. 9 is an example diagram illustrating an example computer architecture to execute one or more operations according to embodiments herein.

FIG. 9 is an example block diagram of a computer system for implementing any of the operations as discussed herein according to embodiments herein.

Any of the resources (such as communication management resource 140, wireless base station 131, replacement wireless base station 431, customer premises equipment 121, customer premises equipment 122, communication device 165, etc.) as discussed herein can be configured to include a respective instantiation of computer processor hardware and corresponding executable instructions to carry out the different operations as discussed herein.

As shown, computer system 950 of the present example includes an interconnect 911 that couples computer readable storage media 912 such as a non-transitory type of media (i.e., any type of hardware storage medium) from which digital information is stored and retrieved, a processor 913, I/O interface 914, and a communications interface 917.

I/O interface 914 supports connectivity to repository 980 and input resource 992. Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in communication management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
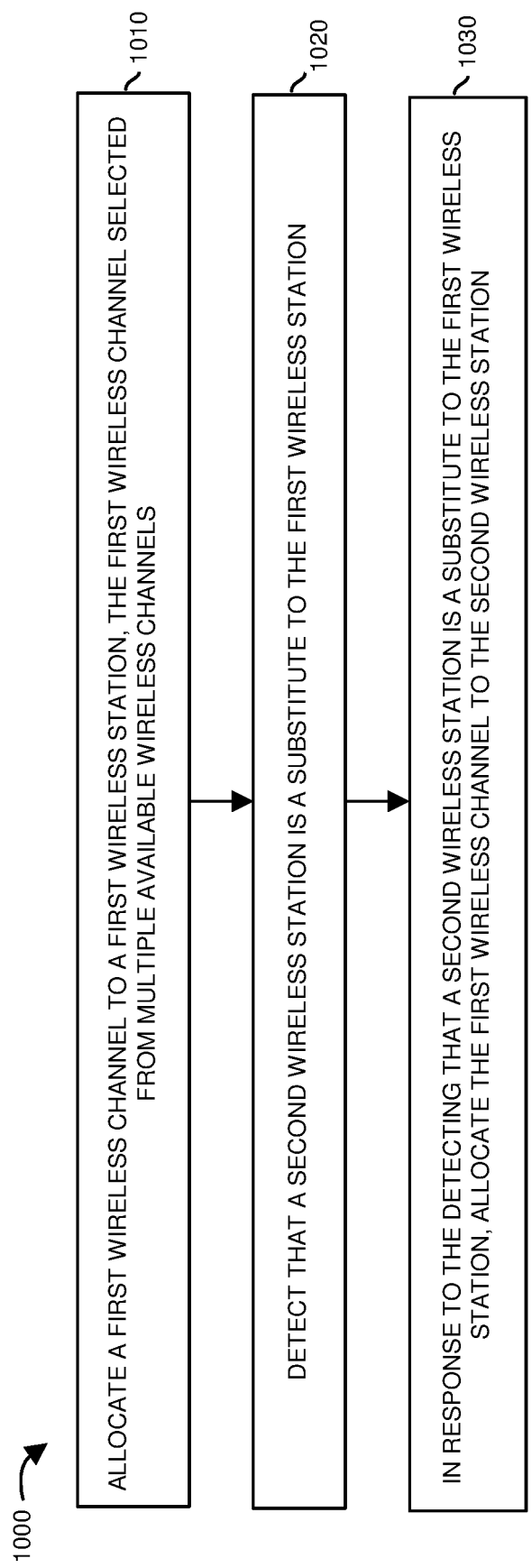
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication management resource 140 allocates a first wireless channel (such as wireless channel #7) to the first wireless station 131. In one embodiment, the first wireless channel is selected from multiple available wireless channels of a shared 1 spectrum.

In processing operation 1020, the communication management resource 140 detects that a second wireless station 431 is a substitute to the first wireless station 131. In processing operation 1030, in response to the detecting that the second wireless station 431 is a substitute to the first wireless station 131, the communication management resource 140 allocates the first wireless channel (such as wireless channel #7) to the second wireless station 431.

Note again that techniques herein are well suited to manage allocation of wireless channels in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    allocating a first wireless channel to a first wireless station, the first wireless channel selected from multiple available wireless channels;
    detecting that a second wireless station is a substitute to the first wireless station based on detecting that the second wireless station resides at a same location as the first wireless station; and
    in response to the detecting that the second wireless station is the substitute to the first wireless station, allocating the first wireless channel to the second wireless station.

2. The method as in claim 1, wherein allocating the first wireless channel includes receiving location information indicating a location of the first wireless station; and
    wherein detecting that the second wireless station is a substitute to the first wireless station includes detecting that the second wireless station resides at the location as specified by the location information.

3. The method as in claim 2, wherein detecting that the second wireless station is a substitute to the first wireless station includes detecting a failure of the first wireless station communicating a heartbeat communication for continued allocation of the first wireless channel.

4. The method as in claim 1 further comprising:
detecting that the second wireless station is the substitute to the first wireless station during registration of the second wireless station as a CBSD (Citizen Band Radio Service Device) communication device.

5. The method as in claim 1, wherein allocating the first wireless channel to the first wireless station includes receiving a model number assigned to the first wireless station; and
wherein detecting that the second wireless station is the substitute with respect to the first wireless station includes receiving notification that the second wireless station is assigned a same model number as the model number assigned to the first wireless station.

6. The method as in claim 1, wherein detecting that the second wireless station is the substitute to the first wireless station includes: during registration of the second wireless station, receiving notification that the second wireless station is operated by a same service provider as the first wireless station.

7. The method as in claim 1, wherein allocating the first wireless channel to the second wireless station includes communicating an identity of the first wireless channel to the second wireless station.

8. The method as in claim 1, wherein detecting that the second wireless station is the substitute to the first wireless station includes detecting replacement of the first wireless station with the second wireless station.

9. A method comprising:
allocating a first wireless channel to a first wireless station, the first wireless channel selected from multiple available wireless channels;
detecting that a second wireless station is a substitute to the first wireless station; and
in response to the detecting that the second wireless station is the substitute to the first wireless station, allocating the first wireless channel to the second wireless station, the method further comprising:
receiving a spectrum inquiry from the second wireless station; and
communicating a spectrum inquiry response to the second wireless station, the spectrum inquiry response including an identity of the first wireless channel assigned to the first wireless station.

10. A method comprising:
allocating a first wireless channel to a first wireless station, the first wireless channel selected from multiple available wireless channels;
detecting that a second wireless station is a substitute to the first wireless station; and
in response to the detecting that the second wireless station is the substitute to the first wireless station, allocating the first wireless channel to the second wireless station;
wherein detecting that the second wireless station is the substitute to the first wireless station includes:
station during registration of the first wireless station to use the first wireless channel;
comparing second installation parameters received from the second wireless station to the first installation parameters; and
detecting that the second wireless station is a physical substitute to the first wireless station based on results of the comparing.

11. The method as in claim 10 further comprising:
detecting that the second wireless station is the substitute to the first wireless station based at least in part on detecting that: i) the second installation parameters received from the second wireless station match the first installation parameters, and ii) a unique identifier value of the second wireless station is different than a unique identifier value assigned to the first wireless station.

12. A method comprising:
allocating a first wireless channel to a first wireless station, the first wireless channel selected from multiple available wireless channels;
detecting that a second wireless station is a substitute to the first wireless station;
in response to the detecting that the second wireless station is the substitute to the first wireless station, allocating the first wireless channel to the second wireless station; and
wherein the first wireless channel is allocated for a duration of time to the first wireless station, the method further comprising:
allocating the first wireless channel to the second wireless station prior to expiration of the duration of time.

13. A system comprising:
a communication management resource operative to:
allocate a first wireless channel to a first wireless station, the first wireless channel selected from multiple available wireless channels;
detect that a second wireless station is a substitute to the first wireless station; and
in response to the detecting that the second wireless station is a substitute to the first wireless station, allocate the first wireless channel to the second wireless station;
wherein the communication management resource is further operative to: during registration of the second wireless station, receive notification that the second wireless station is operated by a same service provider as the first wireless station.

14. The system as in claim 13, wherein the communication management resource is further operative to:
receive location information indicating a location of the first wireless station; and
detect that the second wireless station resides at the location as specified by the location information.

15. The system as in claim 14, wherein the communication management resource is further operative to:
detect a failure of the first wireless station communicating a heartbeat communication for continued allocation of the first wireless channel.

16. The system as in claim 13, wherein the communication management resource is further operative to:
detect that the second wireless station is a substitute to the first wireless station during registration of the second wireless station as a CBSD (Citizen Band Radio Service Device) communication device.

17. The system as in claim 13, wherein the communication management resource is further operative to:
receive a model number assigned to the first wireless station; and
receive notification that the second wireless station is assigned a same model number as the model number assigned to the first wireless station.

18. The system as in claim 13, wherein the communication management resource is further operative to:
receive a spectrum inquiry from the second wireless station; and communicate a spectrum inquiry response to the second wireless station, the spectrum inquiry response including an identity of the first wireless channel allocated to the first wireless station.

19. The system as in claim 13, wherein the communication management resource is further operative to:
receive first installation parameters of the first wireless station during registration of the first wireless station to use the first wireless channel;
compare second installation parameters received from the second wireless station to the first installation parameters; and
detect that the second wireless station is a substitute to the first wireless station based on results of the comparing.

20. The system as in claim 19, wherein the communication management resource is further operative to:
detect that the second wireless station is a substitute to the first wireless station based at least in part on detecting that: i) the second installation parameters received from the second wireless station match the first installation parameters, and ii) a unique identifier value of the second wireless station is different than a unique identifier value assigned to the first wireless station.

21. The system as in claim 13, wherein the first wireless channel is allocated for a duration of time to the first wireless station, the communication management resource further operative to:
allocate the first wireless channel to the second wireless station prior to expiration of the duration of time.

22. The system as in claim 13, wherein the communication management resource is further operative to communicate an identity of the first wireless channel to the second wireless station.

23. The system as in claim 13, wherein the communication management resource is further operative to:
detect physical replacement of the first wireless station with the second wireless station.

24. A method comprising:
allocating a first wireless channel to a first wireless station, the first wireless channel selected from multiple available wireless channels;
detecting that a second wireless station is a substitute to the first wireless station;
in response to the detecting that the second wireless station is the substitute to the first wireless station, allocating the first wireless channel to the second wireless station; and
wherein detecting that the second wireless station is the substitute to the first wireless station includes detecting a failure of the first wireless station communicating a heartbeat communication for continued allocation of the first wireless channel.

25. A method comprising:
allocating a first wireless channel to a first wireless station, the first wireless channel selected from multiple available wireless channels;
detecting that a second wireless station is a substitute to the first wireless station;
in response to the detecting that the second wireless station is the substitute to the first wireless station, allocating the first wireless channel to the second wireless station; and
wherein detecting that the second wireless station is a substitute to the first wireless station includes detecting a failure of the first wireless station.

26. A method comprising:
allocating a first wireless channel to a first wireless station, the first wireless channel selected from multiple available wireless channels;
detecting that a second wireless station is a substitute to the first wireless station;
in response to the detecting that the second wireless station is the substitute to the first wireless station, allocating the first wireless channel to the second wireless station; and
detecting that the second wireless station is the substitute to the first wireless station during registration of the second wireless station for allocation of bandwidth from the multiple available wireless channels.

27. A method comprising:
allocating a first wireless channel to a first wireless station, the first wireless channel selected from multiple available wireless channels;
detecting that a second wireless station is a substitute to the first wireless station;
in response to the detecting that the second wireless station is the substitute to the first wireless station, allocating the first wireless channel to the second wireless station; and
wherein detecting that the second wireless station is the substitute to the first wireless station includes: detecting that the second wireless station is a physical substitute to the first wireless station based on installation information associated with the second wireless station.

28. A method comprising:
allocating a first wireless channel to a first wireless station, the first wireless channel selected from multiple available wireless channels;
detecting that a second wireless station is a substitute to the first wireless station; and
in response to the detecting that the second wireless station is the substitute to the first wireless station, allocating the first wireless channel to the second wireless station; and
wherein detecting that the second wireless station is the substitute to the first wireless station includes: detecting a match of installation attributes of the second wireless station to installation attributes of the first wireless station.

29. A method comprising:
allocating a first wireless channel to a first wireless station, the first wireless channel selected from multiple available wireless channels;
detecting that a second wireless station is a substitute to the first wireless station;
in response to the detecting that the second wireless station is the substitute to the first wireless station, allocating the first wireless channel to the second wireless station;
wherein the first wireless station provides first wireless communication devices first access to a remote network; and
wherein the second wireless station provides the first wireless communication devices second access to the remote network, the second access being a substitution to the first access based on discontinued use of the first wireless station.

30. A method comprising:
allocating a first wireless channel to a first wireless station, the first wireless channel selected from multiple available wireless channels;

detecting that a second wireless station is a substitute to the first wireless station;

in response to the detecting that the second wireless station is the substitute to the first wireless station, allocating the first wireless channel to the second wireless station;

wherein the first wireless station provides first wireless communication devices first access to a remote network prior to substitution of the first wireless station with the second wireless station; and wherein the second wireless station provides the first wireless communication devices second access to the remote network after the substitution of the first wireless station with the second wireless station.

31. A method comprising:

allocating a first wireless channel to a first wireless station, the first wireless channel selected from multiple available wireless channels;

detecting that a second wireless station is a substitute to the first wireless station;

in response to the detecting that the second wireless station is the substitute to the first wireless station, allocating the first wireless channel to the second wireless station;

wherein the second wireless station is detected as being the substitute for the first wireless station subsequent to registration of the second wireless station for allocation of bandwidth from the multiple available wireless channels.

* * * * *

UNITED STATES PATENT AND TRADEMARK OFFICE
CERTIFICATE OF CORRECTION

PATENT NO. : 11,689,983 B2  
APPLICATION NO. : 17/016578  
DATED : June 27, 2023  
INVENTOR(S) : Lakhbir Singh Page 1 of 1

It is certified that error appears in the above-identified patent and that said Letters Patent is hereby corrected as shown below:

In the Claims

Column 19, Claim 10, Line 13, replace "station during" with --receiving first installation parameters of the first wireless station during--

Signed and Sealed this
Twenty-ninth Day of August, 2023

Katherine Kelly Vidal
*Director of the United States Patent and Trademark Office*